Patented Apr. 16, 1935

1,998,092

UNITED STATES PATENT OFFICE 1,998,092

DISINFECTANT FOR SEEDS

Vartkes Migrdichian, Elizabeth, N. J., assignor to American Cyanamid Company, New York, N. Y., a corporation of Maine No Drawing. Application September 5, 1930, Serial No. 480,029

8 Claims. (Cl. 167—38)

This invention relates to seed disinfectants and the process of using same, and concerns, more particularly that class of seed disinfectants which are applied in dust or powder form.

The majority of seeds carry, adhering to the seed coat or just inside of the seed coat, the spores of certain fungi. When the seeds are planted these spores may germinate and the subsequent fungus growth may attack the young seedling plant. This attack may result in a rotting of the roots or the stem, and finally in the death of the plant. In some cases, the growing plant may not even break through the ground before it is killed by the fungus. In any event, such diseases cause a reduction in the stand of various farm products and the like, with consequent loss in production.

Several methods have been devised in the past to disinfect seeds and kill these fungus spores. Certain toxic dust materials have been suggested for use, fumigation with various substances has been tried, and various solutions have been applied to seeds in an effort to reduce the losses due to the various diseases. Substantially all of these methods and substances have not been as successful as might be desired and many are open to serious objections to their use. If the materials attack the seed itself or if they are not correctly applied, the seed may be injured with a reduction in germination. Furthermore, the wet treatment of seed is sometimes inconvenient and requires, in addition, a drying operation which may be costly and otherwise undesirable.

Many of the compounds which have been found to be most successful are compounds involving the use of various mercury salts. Due to the poisonous nature of such substances and the various restrictions imposed upon their shipment, an effective disinfectant containing no mercury has been considered to be very desirable. Further, many of the mercury compounds are of such a nature as to injure the seeds which are treated.

I have discovered that organic cadmium compounds are exceptionally effective seed disinfectants and avoid the objections inherent in the various mercury seed disinfectants and the like. These cadmium compounds are of an organic nature, that is, they are compounds containing both cadmium and carbon in the molecule. As specific examples of such compounds may be mentioned cadmium salts of the organic dithiophosphates, cadmium cyanide, cadmium xanthate, cadmium cyanamid, cadmium salts of the substituted cyanamids such as cadmium phenyl cyanamid, and the like.

The following examples are typical of some of the compositions which I have found effective, although it is understood that the invention is by no means limited thereto.

Example 1

|  | Percent |
|---|---|
| Cadmium cyanide | 10 |
| Talc | 90 |

Example 2

|  | Percent |
|---|---|
| Cadmium di-isopropyl dithiophosphate | 10 |
| Talc | 90 |

Example 3

|  | Percent |
|---|---|
| Cadmium cyanamid | 10 |
| Kieselghur | 90 |

Example 4

|  | Percent |
|---|---|
| Cadmium xanthate | 10 |
| Bentonite | 90 |

Example 5

|  | Percent |
|---|---|
| Cadmium phenyl cyanamid | 15 |
| Talc | 85 |

In many cases, better results are obtained by mixing the cadmium salts with other seed disinfectants. In addition to the usual disinfectant dusts which may be used in this connection, such disinfectants as the other toxic metal salts of the organic dithiophosphates may be used. Other metal salts of the various organic compounds may likewise be used in admixture with the cadmium salts. The following examples are typical of some such mixed disinfectants.

Example 6

|  | Per cent |
|---|---|
| Cadmium phenyl cyanamid | 10 |
| Lead di-ethyl dithiophosphate | 5 |
| Talc | 85 |

Example 7

|  | Per cent |
|---|---|
| Cadmium xanthate | 10 |
| Zinc phenyl cyanamid | 5 |
| Talc | 85 |

Example 8

|  | Per cent |
|---|---|
| Cadmium xanthate | 10 |
| Lead di-ethyl dithiophosphate | 5 |
| Talc | 85 |

Other substances may be mixed with the disinfectants to produce combinations having various valuable properties. For instance, it is sometimes quite desirable to mix with the disinfectant a proportion of such fertilizing materials as ammonium phosphate and the like. It is also desirable with some compositions to add to the disinfectant, materials known as wetting agents which, in these combinations, have the property of assisting the disinfectant in its action upon the treated seeds. The following is a typical example of a compound containing a wetting agent, such as the substituted naphthalene sulphonates, which are very effective in these compositions.

Example 9

|  | Per cent |
|---|---|
| Cadmium cyanamid | 10 |
| Lead di-ethyl dithiophosphate | 5 |
| Wetting agent | 1 |
| Talc | 84 |

The cadmium dusts may be prepared and applied in any suitable and well known manner. While the organic cadmium compounds may be used alone, it is usually preferable and more economical to mix with them inert fillers or spreading materials such as talc, kieselguhr, fuller's earth, silica, silicates, pumice, bentonite, graphite, chalk, and the like. These materials are preferably used in a finely divided form, as are also the cadmium compounds, and mixtures of the ingredients may easily be prepared by grinding them together or by any other suitable method. The proportions of the various ingredients in the finished dust may be varied widely in accordance with the particular results desired and the conditions under which the disinfectants are to be used.

My disinfectants have been found to be valuable in controlling various common and pathological fungus diseases of seeds, such as root rot, Gibberella, Diplodia, and the like. My disinfectants also serve to increase the germination of the treated seeds.

Under some circumstances it may be desirable and feasible to apply the present seed disinfectants in the form of solutions or suspensions in water or other liquid, and the present invention does not preclude such use. For instance, in treating seed potatoes, the disinfectant may be made up of, as a suspension, one or more of the disinfecting compositions, or as a solution of such materials as are soluble. The potatoes or the like are treated by immersing them in the suspension or solution and subsequently drying, if desired.

It will be apparent that my invention is susceptible to many changes and variations without departing from the spirit and scope thereof except as defined in the appended claims.

I claim:

1. A seed disinfectant comprising a simple cadmium salt of a carbon containing acid.

2. A seed disinfectant comprising a material selected from a class consisting of cadmium cyanide, cadmium di-isopropyl dithiophosphate, cadmium cyanamid, cadmium xanthate and cadmium phenyl cyanamid.

3. A seed disinfectant comprising a mixture of a relatively inert diluent and a cadmium compound selected from a class consisting of cadmium cyanide, cadmium di-isopropyl dithiophosphate, cadmium cyanamid, cadmium xanthate and cadmium phenyl cyanamid.

4. A seed disinfectant as defined in claim 3 in which the cadmium compound constitutes approximately 10% of the composition.

5. A seed disinfectant comprising cadmium xanthate.

6. A seed disinfectant comprising a cadmium cyanamid.

7. A seed disinfectant comprising cadmium phenyl cyanamid.

8. A seed disinfectant comprising cadmium cyanide.

VARTKES MIGRDICHIAN.